(12) United States Patent
Comer

(10) Patent No.: US 6,882,843 B1
(45) Date of Patent: Apr. 19, 2005

(54) MULTIPLE WIRELESS DATA TRANSPORT TRANSCEIVER SYSTEM

(75) Inventor: Edward I. Comer, Marietta, GA (US)

(73) Assignee: Cellemetry, LLC, Atlanta, GA (US)

( * ) Notice: Subject to any disclaimer, the term of this patent is extended or adjusted under 35 U.S.C. 154(b) by 140 days.

(21) Appl. No.: 10/038,089

(22) Filed: Jan. 2, 2002

Related U.S. Application Data

(63) Continuation of application No. 09/661,347, filed on Sep. 14, 2000.

(51) Int. Cl.[7] .............................. H04Q 7/20; H04M 1/00
(52) U.S. Cl. .................... 455/445; 455/552.1; 455/466; 455/426.1; 370/238
(58) Field of Search ............................. 455/466, 552.1, 455/553.1, 103, 67.11, 445, 426.1, 461, 462, 465, 456.5; 370/352–356, 238

(56) References Cited

U.S. PATENT DOCUMENTS

| | | | |
|---|---|---|---|
| 5,546,444 A | * | 8/1996 | Roach et al. ............. 455/412.2 |
| 5,719,918 A | | 2/1998 | Serbetciouglu ............. 380/271 |
| 5,761,621 A | * | 6/1998 | Sainton ....................... 455/453 |
| 5,819,184 A | | 10/1998 | Cashman |
| 5,873,043 A | | 2/1999 | Comer |
| 5,903,832 A | * | 5/1999 | Seppanen et al. ........ 455/435.3 |
| 5,974,328 A | * | 10/1999 | Lee et al. ................. 455/456.3 |
| 6,108,537 A | | 8/2000 | Comer et al. |
| 6,150,955 A | | 11/2000 | Tracy |
| 6,154,658 A | | 11/2000 | Caci |
| 6,161,020 A | | 12/2000 | Kim |
| 6,370,135 B1 | * | 4/2002 | Gardner ....................... 370/352 |
| 6,424,841 B1 | * | 7/2002 | Gustafsson ................. 455/466 |

FOREIGN PATENT DOCUMENTS

| | | | | |
|---|---|---|---|---|
| EP | 0123456 A2 | | 1/2000 | |
| WO | WO 95/25407 | * | 9/1995 | ............ H04Q/7/22 |

* cited by examiner

*Primary Examiner*—Duc M. Nguyen
(74) *Attorney, Agent, or Firm*—King & Spalding LLP

(57) ABSTRACT

A wireless communications device that can support the communication of a data message via a selected one of multiple wireless data transport (WDT) technologies. A wireless communications device can support CDPD, control channel data transport technologies, such as the "CELLEMETRY" data communications service, and voice-channel modem operations by combining these WDT technologies within a single radio device. In the radio-to-base system direction, the appropriate WDT technology can be chosen based upon the data volume for the communication application. A control channel data transport technology can be used for very low volume; CDPD can be used for medium volume; and voice-channel modem operation can be used for large volume. The appropriate WDT technology can be automatically selected for use with the present data application to achieve an effective communication of the data content via the cellular system while also accomplishing a least cost distribution of the data content. The wireless communications device can be implemented by a single monolithic component for efficient manufacture and convenient use.

17 Claims, 4 Drawing Sheets

MULTIPLE WIRELESS DATA TRANSPORT TRANSCEIVER SYSTEM

RELATED APPLICATIONS

This application is a continuation of and claims priority under 35 U.S.C. § 120 to pending U.S. patent application Ser. No. 09/661,347 entitled "Multiple Wireless Data Transport Transceiver System," filed on Sep. 14, 2000 which is hereby fully incorporated herein by reference.

TECHNICAL FIELD

The present invention relates generally to wireless communication devices. More particularly, the present invention is directed to a data communications device capable of communicating with a selected one of multiple wireless data transport technologies, such as cellular digital packet data (CDPD), short message service (SMS), and other wireless data transport technologies.

BACKGROUND OF THE INVENTION

Although cell-based wireless communication systems first attracted the attention of the average consumer as a useful mechanism for communicating voice signals, modern cellular systems today are often used to transport digital data. The explosive growth in both business and personal transmission of digital data via cellular systems has resulted in the deployment of multiple wireless data transport technologies (WDTs). WDTs includes Cellular Digital Packet Data (CDPD), overhead control channel data transport communications, and Short Message Service (SMS), as implemented by IS-136, IS-91(A), IS-95, IS-637, and GSM-compatible cellular systems.

CDPD is a digital cell-based network that is deployed in cellular telephony networks as an overlay network to an existing circuit-switched cellular system. CDPD provides a way to transmit data over an analog cellular telephone network and is best-suited for applications requiring short, bursty, data transmissions. For example, data is transmitted in packets of information, rather than in a continuous data stream, and occupies naturally occurring lulls or gaps in the usage of the cellular communication channels. Each data packet has an address using the Internet Protocol (IP). Data packets can be transmitted across the cellular network independently, with the network protocols managing access, routing, and prioritization of packet distribution. The CDPD technology is described in U.S. Pat. No. 5,819,184, which is hereby incorporated fully herein by reference.

Although CDPD supports small and medium volume data communications, CDPD at present lacks adequate coverage for some data communication applications because selected cellular carriers have not elected to deploy CDPD technology in their service areas. CDPD is at present typically deployed only in dense urban areas and is not available in all geographical areas that might benefit from this WDT.

The "CELLEMETRY" data communications service, as described in U.S. Pat. No. 5,546,444, takes advantage of the underutilized capacity of the overhead control channels of advanced mobile phone service (AMPS) and digital AMPS-based (DAMPS) cellular telephony systems to convey short data messages between a subscriber unit and a base station. Although the overhead control channels are primarily used to transmit necessary information for all incoming and outgoing call initiations, this overhead control channel data transport service also can insert data content within an Autonomous Registration signal or a Call Origination signal to convey that data content. The "CELLEMETRY" data communications service can wirelessly convey data content from a subscriber unit to a remote host via the cellular switch by mimicking the conventional roaming (or Call Origination) messages of the AMPS/DAMPS overhead control channels and the SS7/IS-41 network. Detailed information describing the "CELLEMETRY" data communications service can be found in U.S. Pat. No. 5,546,444, which is fully incorporated herein by reference. An alternative overhead control channel data transport service is based on the use of a feature request field in a AMPS/DAMPS message, as described in U.S. Pat. No. 5,771,455.

Because the "CELLEMETRY" and the feature request-based data communications services rely upon the overhead control channel as the data transport medium, these communication services can lack sufficient data carriage capacity for certain applications requiring expanded data content, particularly in the direction toward the subscriber unit. Consequently, the "CELLEMETRY" and feature request-based data communications services typically are not able to support wireless data communication applications requiring the communication of expanded data content or high volume communications.

In view of the foregoing, there is a need in the art for a data communications system that can overcome the limited deployment of CDPD networks and the limited data capacity of overhead control channel data transport technologies, such as the "CELLEMETRY" data communications service. There is a further need in the art for a data communications device that is compatible with multiple wireless data transmission technologies to support consistent and economical cell-based communication operations based upon the most appropriate WDT technology that is available in the service location. The present invention solves the problems of the prior art by providing a communications device that can support multiple WDT technologies, including CDPD, control channel data transport technologies, such as the "CELLEMETRY" data communications service, and other WDT technologies, such as voice-channel modem technologies. For example, a communications device constructed in accordance with the present invention can select the appropriate WDT technology based upon the transport technology best suited to accomplish the communication objective.

SUMMARY OF THE INVENTION

The present invention is directed to a wireless communications device that can support multiple wireless data transport (WDT) technologies. The invention enables the communication of variable data content in an efficient and cost effective manner by selecting one of the available WDT technologies to complete the communications application. For one aspect of the present invention, a wireless communications device can support CDPD, SMS control channel data transport technologies, such as the "CELLEMETRY" data communications service, and voice-channel modem operations by combining these WDT technologies within a single radio device. In the radio-to-base system direction, the appropriate WDT technology can be chosen based upon the data volume for the communication application. A control channel data transport technology can be used for low volume; SMS can be used for medium volume; CDPD can be used for large volume; and voice-channel modem operation can be used for very large volume. The appropriate WDT technology can be automatically selected for use with the present data application to achieve an effective communication of the data content via the cellular system while also accomplishing a least cost distribution of the data content.

DETAILED DESCRIPTION OF THE EXEMPLARY EMBODIMENTS

The present invention is directed to a communications device that can communicate wireless data content based upon the selection of an appropriate wireless data transport (WDT) technology, such as Cellular Digital Packet Data (CDPD), control channel data transport, Short Message Service (SMS), voice-channel modem, and other cellular system technologies. Prior to reviewing the implementation of the exemplary embodiments of the present invention, it will be useful to review a representative operating environment of the present invention.

Figure 1:
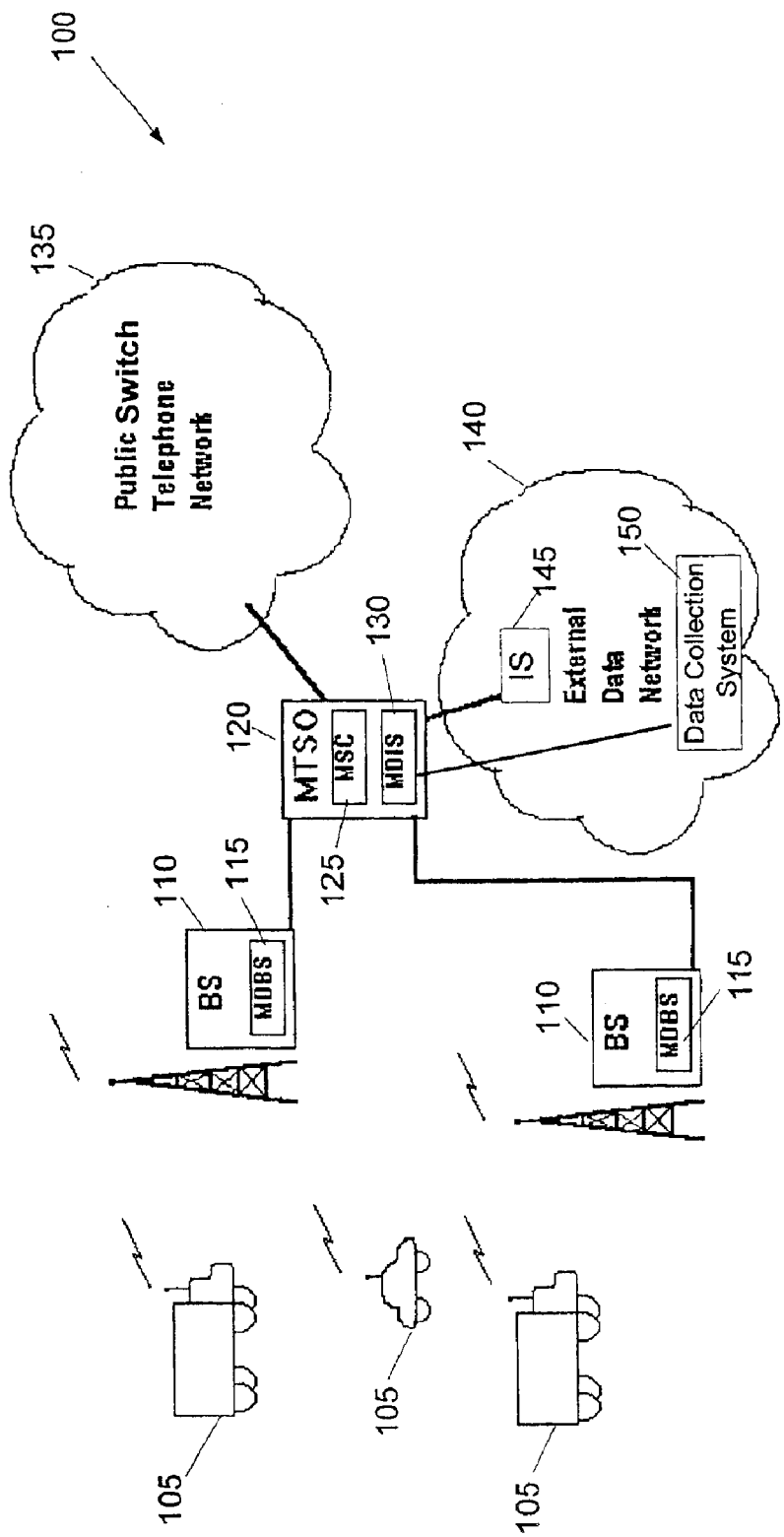
FIG. 1 is a block diagram of an exemplary data communications network forming the operating environment for a communications device operable with multiple wireless data transport technologies.

Turning now to the drawing set, in which like reference numbers represent like elements, FIG. 1 is a block diagram of a typical data communications network that supports the operation of the inventive communications device. FIG. 1 presents a representative network architecture, shown as a communications network 100, for supporting conventional WDT technologies, including CDPD, control channel data transport, SMS, and voice-channel modem technologies. Although the present invention is not limited to these conventional WDT technologies, it will be appreciated that the communications data network 100 of FIG. 1 is representative of an architecture that supports the use of multiple cell-based communication technologies to transport data between a subscriber's radio unit and a data network.

A data communications network for a selected geographic location may support only a single WDT technology, whereas a network in another geographical location may support multiple WDT technologies. Because a subscriber's radio unit may travel among locations that support different WDT technologies, the present invention provides a communications device that can communicate wireless data content based upon the selection of a WDT technology operable in the present location of the communications device. If more than one WDT technology is available in the operating location, then the inventive communications device can select an appropriate WDT technology based upon the characteristics of the data content to be transported via the cell-based network. For example, if the network 100 supports both CDPD and a control channel data transport technology, the size of the data content to be communicated via the network may determine the selection of the WDT technology useful for that data transport application. Data content having a low volume can be communicated by the communications device based upon a selection of a control channel data transport technology. In contrast, the communications device can select SMS for a medium volume message and use CDPD for the communication of data content having large volume. The communications device can select a default WDT of voice-channel modem operation for data content representing very large volume. This selection of the appropriate WDT for communicating data content can be automatically made by the communications device on a packet by packet basis.

For CDPD operations in the communications network 100, a subscriber radio unit 105, represented by mobile users travelling in vehicles, can communicate with the mobile telephone switching office (MTSO) 120 via a base station 110 that operates within one of multiple cells supported by the MTSO. The subscriber radio unit 105, often described as a subscriber terminal unit or a mobile end system (MES), typically comprises a personal communications device that can send wireless data to a mobile data base station (MDBS) 115 located at the base station 110 and can receive wireless data content from the MDBS. The subscriber radio 105 can use the same transmission channels as a conventional cellular telephone network for transmission of data packets to the MDBS 115. The MDBS 115, which typically operates at a cell site, such as the base station 110, can send and receive data between the subscriber radio unit 105 and a mobile data intermediate system (MDIS) 130.

The MDBS 115 can utilize a channel within an AMPS cell to establish a communications link and to communicate with a subscriber radio unit 105. The subscriber radio unit 105, also identified as an MES, is typically a portable computer, hand-set, or other portable electronic device containing a subscriber communication unit. The MDBS 115 serves as a communication link between the subscriber radio unit 105 and the MDIS 130 to support the communication of data packets in the CDPD network.

The MDBS 115 manages channel operations by monitoring network channels to detect the existence of competing voice calls and to identify all unused network channels to find suitable "hopping" channels. Because CDPD typically shares network channels with the cellular telephony network, the MDBS 115 can assign a CDPD call to another network channel when a voice call requires the use of the network channel assigned to that CDPD call. In other words, a cellular voice call has priority over any CDPD call carried by a network channel of the cellular telephony network. Consequently, the MDBS 115 will require a CDPD call to "hop" network channels in response to detecting a competing voice call on the network 100. The MDBS 115 also can support a "hop" when the subscriber radio unit 105 moves from one cell to a cell supported by another base station 110.

The MDIS 130, which is typically installed at the MTSO 120, operates as a liaison between the cellular telephony network and an external data network, such as the network 140. The MDIS 130 can accept data packets output by the MDBS 115 and, in response, the MDIS converts the data content to an Internet Protocol (IP) format for transmission to an intermediate system (IS) 145. The MDBS 115 also can accept IP-formatted packets from the IS 145 and, in response, the MDBS processes the data for transmission via a channel of the cellular telephony network.

The MDIS 130 also manages new registration of subscriber radio units 105 operating in its service area. For example, an MDIS can operate as either a "home" or a "serving" registrar. A home MDIS represents the primary registrar for a subscriber radio unit 105. In contrast, a MDIS operates as a serving registrar when the MDIS accepts a registration of a subscriber radio unit 105 that is not associated with its home service area. A CDPD-specific mobile network location protocol (MNLP) is preferably operated between each MDIS 130 to exchange location information regarding the subscriber radio units 105.

An external data network 140 typically comprises one or more ISs 145 that operate as routers for directing data packets to a correct location, such as a fixed network. Typical fixed networks include external computer networks, administrative servers, and network accounting servers.

The CDPD network is designed to operate as an extension of existing communication networks, such as the advanced mobile phone service (AMPS) network and the Internet. The CDPD network typically shares the transmission facilities of an existing AMPS network and provides a non-intrusive, packet-switched data surface that does not impact AMPS service. In effect, the CDPD network is transparent to the operation of the AMPS network, which is "unaware" of the CDPD function. The CDPD network can share the same carrier frequencies assigned to AMPS channels, as described in the CDPD specification, version 1.1.

The communications network 100 also can support cellular telephony communications as a conventional AMPS network. The MDBS 115 is the CDPD equivalent to an AMPS base station 110. Both serve as links to subscriber radio units 105 to support data communications for CDPD and AMPS-compatible technologies. The MDIS 130 is an equivalent to the mobile switching center (MSC) 125, which can control one or more of the base stations 110. The MSC 125 is responsible for connecting the subscriber radio unit 105 to another party via the public switch telephone network (PSTN) 135 for an AMPS-compatible communication.

An overhead control channel data communications service, such as the "CELLEMETRY" data communications service offered by Cellemetry LLC of Atlanta, Ga., can use the underutilized capacity of overhead control channels for AMPS and DAMPS-based cellular telephony systems to convey short data messages between a subscriber unit and a data collection or processing system. Referring still to FIG. 1, a subscriber radio unit 105 can generate a Call Origination or Autonomous Registration signal carrying data content within the Electronic Serial Number (ESN) field for transmission to the MTSO 120 via the base station 110. The MSC 125 operating at the MTSO 120 can detect an Autonomous Registration signal or a Call Origination signal with message data content and forward that message to an external data network 140 using the SS7/IS-41 network protocol. In this manner, the subscriber base unit 105 can transmit data content via the overhead control channel via the MSC 125 to a remote host by "mimicking" the normal roaming messages carried by an AMPS/DAMPS control channel and an SS7/IS41-compatible network. Detailed information describing this overhead control channel communication service and the supporting network architecture can be found in U.S. Pat. No. 5,546,444, which is hereby fully incorporated herein by reference.

For the communications network 100, a representative overhead control channel data communication system can wirelessly convey data from a subscriber radio unit 105 capable of inserting the data content within the ESN field of an Autonomous Registration or Call Origination signal. For example, the subscriber radio unit 105 can transmit a data message containing the data content within the ESN field to the MSC 125 via the reverse control channel (RECC) of the overhead control channel extending between the subscriber radio unit 105 and the MSC 125 via the base station 110. The MSC 125 can receive a data message via the RECC from subscriber radio unit 105 operating within coverage areas of the cellular mobile radiotelephone (CMR) system. In turn, the MSC 125 can send the data message to a data collection system 150 operating within the external data network 140 via a communications link. The collection system 150 can store each data message and can process the data content of such data messages. The data collection system 150 typically accepts data communications that are compatible with the IS-41 protocol or alternative vendor proprietary protocols. The data collection system 150 also can transmit the data message to a separate processing system (not shown) via a communications link for processing of data content at a central location that is more convenient for a user.

In response to the transmission of an overhead control channel data message by the subscriber radio unit 105, the MSC 125 typically makes a determination whether that device is an authorized user or subscriber of the services offered by the communications network 100. Based upon information provided by the subscriber radio unit 105 in the data message, the MSC 125 can determine that the communicating device should be treated as a "roamer" associated with another cellular system. Consequently, the MSC 125 forwards the data message to the data collection system 150 operating within the external data network 140 via a communications link. Unlike the MSC 125, the data collection system 150 can recognize that the received data message contains data content transmitted by a particular subscriber radio unit 105. The data collection system 150 can store the data content, process the data content, or forward the data content to a separate data processing system. The communications link between the data collection system and the data processing system can be implemented by a variety of communications protocols.

The data message carried by this representative overhead control channel data communications system typically comprises data content and a predetermined identifying characteristic that uniquely identifies the subscriber base unit responsible for transmitting the data message to the MSC. For example, the data message can be formatted to correspond to an Autonomous Registration signal, which is normally transmitted by a cellular radiotelephone unit when the device first identifies itself to the CMR system. The predetermined identifying characteristic can be inserted within a data field that represents the mobile telephone number and the data content can be inserted within a data field that represents the ESN. Consequently, the subscriber radio unit can communicate the data content via the control channel of the CMR system when the device first identifies itself or "registers" for operation with the MSC. A similar communication operation can be completed in response to the subscriber radio unit 105 transmitting a Call Origination signal carrying data content within the ESN field. An alternative overhead control channel data service uses the feature request field in a cellular mobile radiotelephone message to support the communication of data from a subscriber terminal unit to the MSC via the RECC, as described in U.S. Pat. No. 5,771,455.

SMS can also be supported by the communications network 100 shown in FIG. 1. SMS provides a cellular subscriber with the ability to send and receive text messages typically comprising 2000 bytes of information or less. A subscriber radio unit 105 can receive a short message from a source via the MSC 125. Point-to-point, point-to-multipoint, and broadcast message delivery mechanisms can be supported by the CMR architecture illustrated in FIG. 1. The radio subscriber unit 105 also can transmit an SMS-compatible message via the MSC 125 to a message center for delivery to the message addressee. The message center can be connected to the MSC 125 via either the PSTN 135 or the external data network 140.

It will be appreciated that the computer network 100 illustrated in FIG. 1 also supports the communication of data by a modem over the voice-channel between the subscriber radio unit 105 and the MTSO 120. For example, an analog modem can be used by a subscriber radio unit 105 to transmit data via an analog voice-channel to communicate data via the MTSO 120 to the PSTN 135 or the external data network 140. Data also can be transmitted between a subscriber radio unit 105 and another data device via the communication network 100 by either a circuit-switched transmission or a packet transmission. For a circuit-switched data transmission, the MSC 125 can convert data content transmitted by a subscriber radio unit 105 to a modem signal for communication to another data device via the PSTN 135. For a packet data transmission, the base station 110 can convert a packet of information transmitted by a subscriber radio unit 105 to a format for communication to the MSC 125. Based upon the address contained in the packet, the MSC 125 can route the data directly to a packet data network, such as an external data network 140. For packet data communications, the external data network 140 is typically implemented by the global Internet or a public packet data network.

Although an exemplary communications device of the present invention can select among the CDPD, control channel data transport, SMS, or voice-channel modem technologies for communicating data in the communications network 100, it will be understood that other WDT technologies are within the scope of the present invention. The exemplary communications device can simultaneously support multiple WDT technologies to enable the selection of an appropriate WDT technology for a data transport application in a particular communications network encountered by the communications device. Although the present invention will be described in connection with a data communication from a subscribe terminal unit to a base station, it will be understood that communications in the direction of the base station to the communications device are also supported by this invention.

Figure 2:
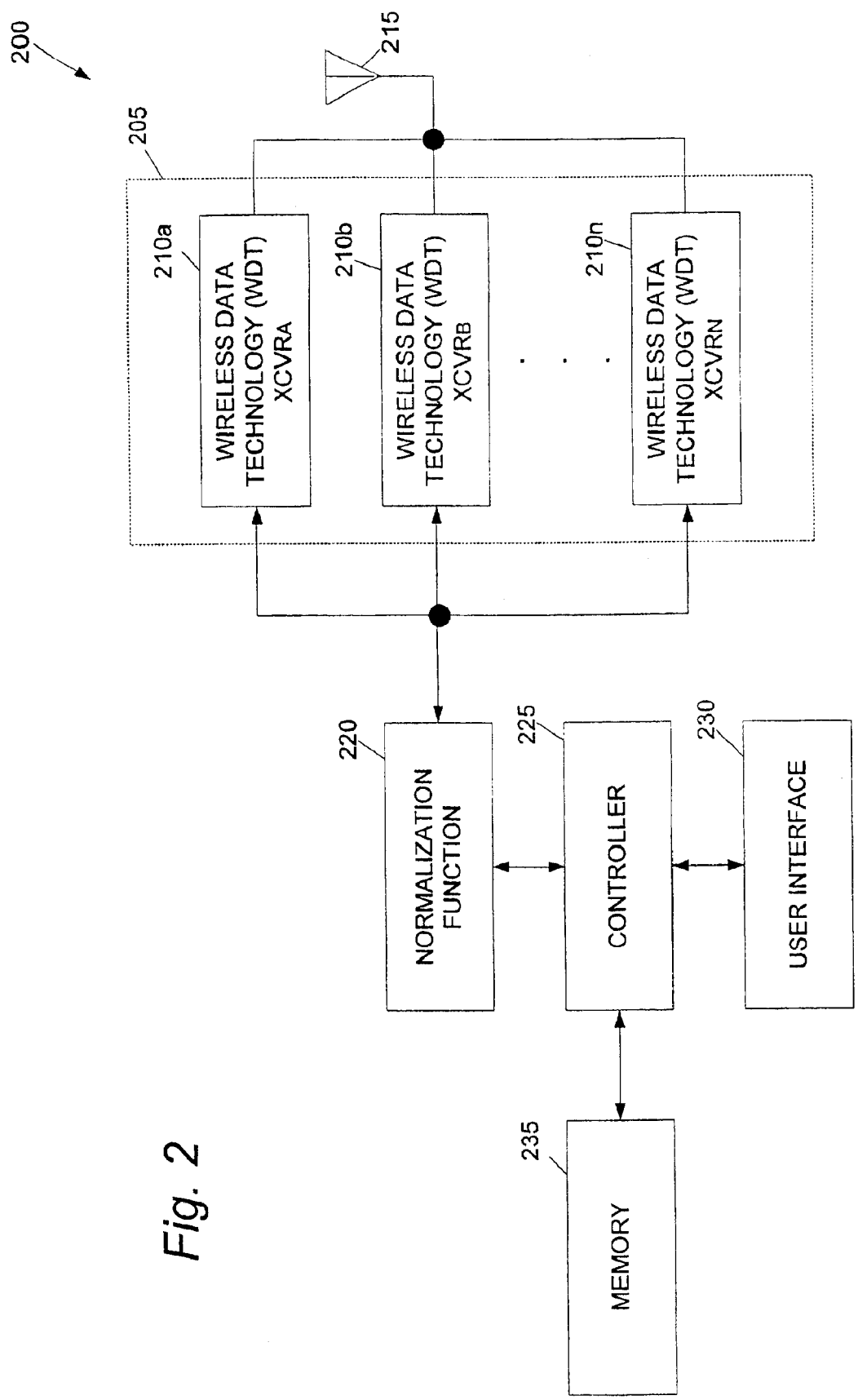
FIG. 2 is a communications device operable to support multiple wireless data transport technologies in accordance with an exemplary embodiment of the present invention.

FIG. 2 is a block diagram illustrating the components of a communications device operable with a subscriber terminal unit constructed in accordance with an exemplary embodiment of the present invention. Turning now to FIG. 2, a communications device 200 comprises a WDT transceiver system 205 comprising multiple transceivers 210*a*, 210*b* . . . 210*n*, each coupled to an antenna 215. Each transceiver 210*a–n* can support a particular WDT technology, such as CDPD, control channel data transport, SMS, or modem technology. Each transceiver 210*a–n* is also coupled to a normalization function 220 for placing data in a format compatible with a selected WDT for the corresponding transceiver 210*a–n*. A controller 225 controls the operations of the communications device 200 and communicates with the normalization function 220, a user interface 230, and memory 235. The user interface 230 is preferably a unified user interface compatible with the WDTs for the corresponding transceivers 210*a*–210*n*, thereby presenting a unified interface for user operation regardless of the selected data transport technology. The memory 235 can store firmware comprising instructions for execution by the controller 225 to enable communication operations by the communications device 200. In addition, the memory 235 can store data input by the user via the user interface 230 for transmission by a selected transceiver 210. The memory 235 is further useful for storing data received by the communications device 200, including the identity of each WDT supported by an operating environment.

The WDT transceiver system 205 is implemented by the aggregation of multiple transceivers 210, each operable to support data communications with a particular WDT. Each transceiver 210*a–n* comprises the combination of a transmitter and a receiver operable with a particular WDT technology and typically connected to a common antenna, such as the antenna 215. For a particular data transport application, the controller 225 can selected one of the transceivers 210*a–n* to support a data communication operation via a corresponding WDT. For example, the controller 225 can selected a particular transceiver 210*a–n* because the WDT technology supported by that transceiver is operable in the present location of the communications device 200. If more than one WDT technology is supported by an operating location, the controller 225 can select one of the transceivers 210*a–n* to transport data via a WDT technology compatible with the characteristics of that data content.

For a representative example, the transceiver 210*a* is compatible with SMS and transceiver 210*b* is compatible with a control channel data transport technology. Assuming that the communications device 200 encounters a cell-based network that supports both SMS and control channel data transport technologies, the controller 225 selects either the transceiver 210*a* or the transceiver 210*b* for communication of a data message based upon the size of a data content to be communicated via that network. For data content having low volume, the controller 225 preferably selects the transceiver 210*b* to communicate the data content via the control channel data transport technology. In contrast, the controller 225 can select the transceiver 210*a* to communicate data content having medium volume via the SMS transport technology.

The normalization function 220 can complete a transformation of data content to be transmitted by a selected transceiver 210 to a format that is acceptable for processing by that transceiver. The normalization function 220 also can transform data content received by a selected transceiver 210 for presentation to the user via the user interface 230 and for storage in the memory 235. The normalization function 220 may comprise one or more transformation processes to support the operation of multiple transceivers in the WDT transceiver system 205.

The user interface 230 preferably provides a unified interface for a user to enter and to receive data and to enter commands in connection with the operation of the multiple transceivers of the WDT transceiver system 205. The user interface 230 typically comprises a keyboard or keypad and a display, such as a liquid crystal display (LCD) or light emitting diode (LED) display. The user interface 230 provides a common interface for a user to operate with the various data transport technologies supported by the WDT transceiver system 205.

The memory 235 can store a data set defining the transmission and reception characteristics for each of the transceivers 210*a–n*, including information designating a particular transceiver 210 as operable to support a specified WDT technology. The memory 235 also can include a data set, typically maintained as an array or a table, comprising criteria for selecting a particular WDT (and a corresponding transceiver 210) to convey a data message or packet via the communications network defining the operating environment of the communications device 200. For example, a representative list in the memory 235 can link communication of a message having low data volume with the transceiver 210 that supports a control channel data transport technology. Likewise, this list can link communication of a message having medium volume with the transceiver 210 supporting SMS transport technology. This list may further identify the transceiver operable with a voice channel modem as responsible for communicating data messages having a very large data size or volume. In the context of this representative example, a low data volume is represented by a data set defined in terms of bits; medium data volume is represented by 100's bytes; large data volume is represented by 1000's bytes; and very large data volume is represented by 10,000's bytes. The memory 235 can further provide storage for an instruction set executable by the controller 225 and normalization data for use by the normalization function 220.

Although data volume or size provides a representative example of the characteristic selecting a WDT and corresponding transceiver for communicating the data message, those skilled in the art will appreciate that alternative selection criteria also can be used to select an appropriate WDT and the corresponding transceiver supporting that WDT. For example, alternative selection criteria can include communication latency requirements, time of day, message delivery priority, availability of a preferred communication network and WDT, and communication pricing or cost. A "least-cost" WDT selection algorithm can be used to apply a variety of selection criteria to the requirements of a particular data message communication to determine the appropriate WDT (and corresponding transceiver 210) for communicating that data message. This least-cost WDT selection algorithm can be based upon a heuristic process to support a learning capability based upon prior communication operations.

The communications device 200 can be implemented as a single monolithic component for incorporation within a subscriber terminal unit, such as the subscriber radio unit 105 illustrated in FIG. 1. In the alternative, the communications device 200 can be implemented by a hybrid architecture of discrete components and a monolithic component comprising the transceivers 210*a–n* of the WDT transceiver system 205. The component count of the communications device 200 can be minimized by the common use of the antenna 215 by the various transceivers 210*a–n* and the use of centralized transformation operations by the normalization function 220. In contrast to the prior art, the communications device 200 incorporates multiple data transport technologies for wireless data communications within a single wireless communications device.

Figure 3:
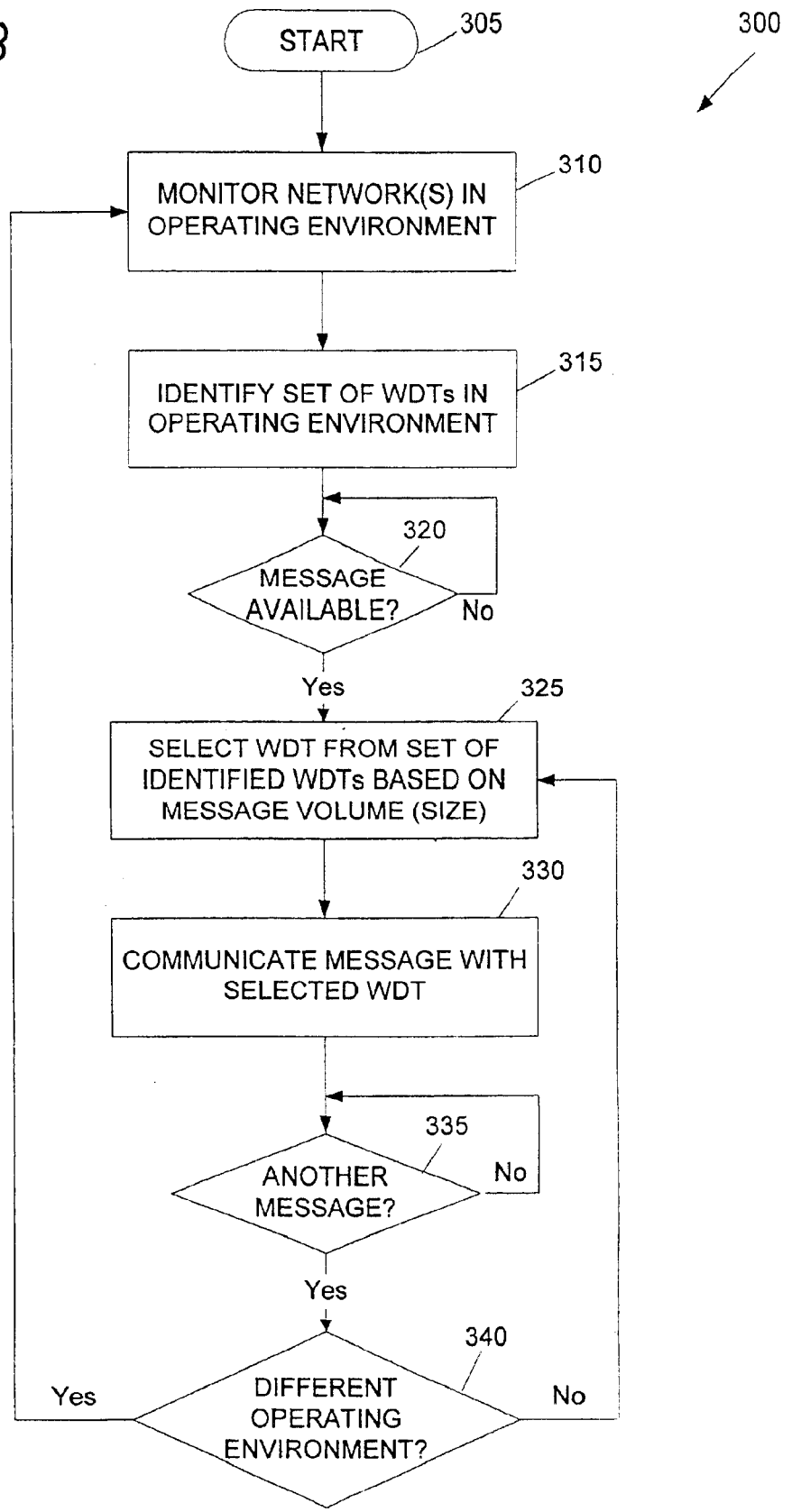
FIG. 3 is a logical flowchart diagram illustrating the steps of a method for communicating data content via a selected wireless data transport technology based upon the message volume and the operating environment in accordance with an exemplary embodiment of the present invention.

FIG. 3 is a logical flow chart diagram illustrating an exemplary process for communicating data with a selected WDT based upon the subscriber terminal unit's operating environment and the volume or size of the data message to be communicated in that operating environment. Turning now to FIG. 3, an exemplary process 300 is initiated at the START step 305, typically by powering on a subscriber terminal unit, such as the subscriber radio unit 105 (FIG. 1) incorporating the communications device 200 (FIG. 2). In step 310, the communications device monitors the communication network(s) in the operating environment of the subscriber terminal unit. It will be appreciated that an operating environment can include one or more communication networks operable for communicating data content via a wireless data transport mechanism. In a representative communications environment, WDT's can include an overhead control channel transport, CDPD, SMS, and voice-channel modem transport technologies.

In step 315, the communications device identifies each WDT available in the operating environment based upon the monitoring operation completed in step 310. The WDTs available at the subscriber terminal unit for communicating a data message are defined by the intersection of the set of WDTs identified in response to the monitoring task and the WDTs supported by the multiple transceivers of the communications device. For example, each WDT identified as operating in the operating environment may not be supported by the WDT transceiver system of the communications device. On the other hand, the WDT transceiver system may include a transceiver operable with a WDT that is not operating in the operating environment of the subscriber terminal unit. If two or more WDTs are identified in the operating environment and supported by the subscriber terminal unit, a decision can be made to select the WDT that is most appropriate for communicating data based upon decision criteria applied at by the subscriber terminal unit.

In step 320, an inquiry is conducted to determine whether a message or packet for transporting data content is available for processing by the communications device of the subscriber terminal unit. If the response to this inquiry is negative, the "NO" branch is followed to step 320 to complete a loop and to begin the task again. In contrast, if the response to the inquiry in decision 320 is positive, the "YES" branch is followed to step 325. A WDT supported by the communications device is selected in step 325 from the set of identified WDTs in the operating environment. The subscriber terminal unit will use the selected WDT to communicate the data message. The decision to select a particular WDT to communicate the message can be made based upon characteristics of the data message, such as message volume or size, or the particular communication application. For example, a representative selection process matches an appropriate WDT transceiver for communicating the message with the corresponding WDT in the operating environment of the subscriber terminal unit based upon the volume of the data to be transported in that message. In step 330, the communications device communicates the message with the data content by using a transceiver operable with the selected WDT.

For the representative communication example shown in FIG. 3, the WDT (and the corresponding transceiver) for communicating the data message can be selected based upon the data volume of the message. If the message comprises a low data volume, the transceiver supporting an overhead control channel transport technology can be selected to communicate the data message. If, on the other hand, the message comprises a medium data volume, the transceiver operable to support SMS can be selected to communicate the message. Significantly, this selection of the WDT and corresponding transceiver requires an analysis of the data content to be communicated by the communication device of the subscriber terminal unit. The exemplary communications device supporting this communication application uses the WDT that provides the most efficient transport mechanism for wirelessly conveying a message having a certain data content size. On a dynamic, real-time basis, the communications device can select and route data messages via different WDT's available within the operating environment and supported by that communications device based upon an analysis of the characteristics of the data carried by each message.

Alternative selection criteria can include the cost of communicating a data message via a particular WDT, the latency for communicating the message in the communications network, time of day, the availability of a preferred communications network and WDT, the urgency or priority of the data message, and the location of the recipient of the data message. Selection criteria can be weighted and applied in combination to a particular data message to support the selection of an appropriate WDT for transporting the data message in a communication network.

In step 335, an inquiry is conducted to determine whether another message or packet is available for communication by the subscriber terminal unit. The process 300 illustrated in FIG. 3 is capable of assigning a transceiver for communicating a data packet or message via a selected WDT on a message by message basis. If the response to this inquiry is negative, the "NO" branch is followed again to step 335 to begin the inquiry anew. Otherwise, the "YES" branch is followed from the decision block 335 to a decision block 340. In step 340, a determination is made whether the subscriber terminal unit is operating in a different operating environment. If so, the "YES" branch is following form the decision block 340 to step 310. Otherwise, the "NO" branch is followed from the decision block 340 to step 325.

Figure 4:
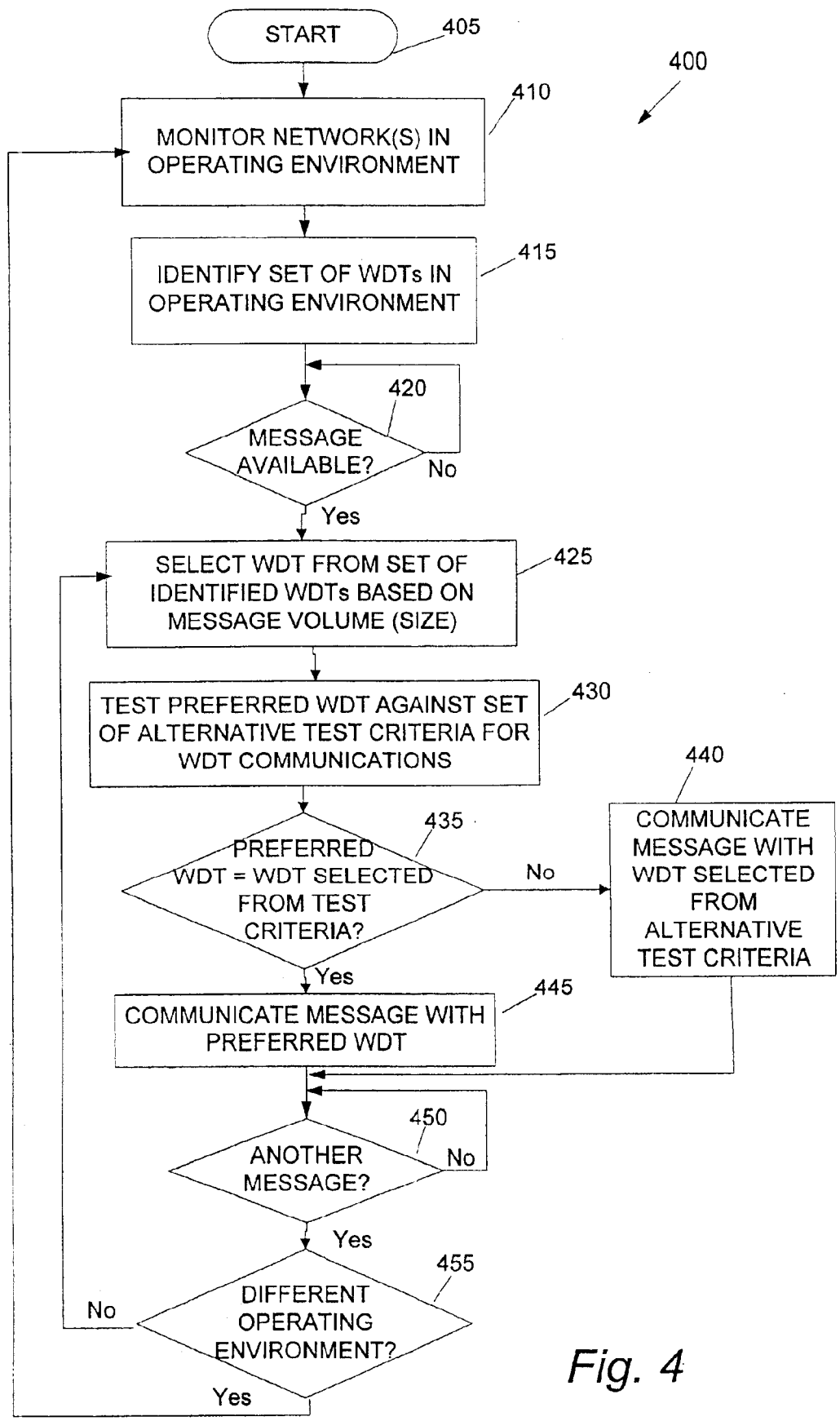
FIG. 4 is a logical flowchart diagram illustrating the steps of a method for communicating data content via a selected wireless data transport technology based upon predetermined test criteria and the operating environment in accordance with an exemplary embodiment of the present invention.

FIG. 4 is a logical flow chart diagram illustrating an alternative exemplary process for communicating data with a selected wireless data transport technology in a communication network. Turning now to FIG. 4, the exemplary process 400 is initiated at the START step 405 and proceeds to step 410 for monitoring of communication data network (s) available in the operating environment of a subscriber terminal unit. The subscriber terminal unit includes a communications device operable with one or more wireless data transport mechanisms to support the efficient communication of data content in a variety of operating environments. An exemplary communication device that can support the process of FIG. 4 is shown in FIG. 2 and described above in connection with that drawing. The subscriber terminal unit in step 415 identifies each WDT available and operable in the operating environment of the terminal in response to the monitoring operation completed in step 410.

In step 420, the subscriber terminal unit completes a determination of whether a message containing data content is available for processing by the unit. If the response to this inquiry is negative, a loop is followed back to step 420 and the process begins anew. Otherwise, the "YES" branch is followed from decision block 420 to step 425. In step 425, a WDT supported by a transceiver at the subscriber terminal unit is selected to support the communication of the message in the operating environment. The selected WDT corresponds to one of the WDTs identified in step 415 and is chosen based upon the volume of the data content carried by the message. Each WDT supported by the communication device of the subscriber terminal unit is characterized as best supporting one or more classes of data content volume or size, as described above in connection with the exemplary process of FIG. 3. The selected WDT is designated as the preferred WDT for communicating the message by the subscriber terminal unit in the operating environment.

In step 430, the WDT selected in step 425 is tested against a set of alternative test criteria for WDT communications. Although the WDT selected in step 425 is preferred for communicating a message having a certain data volume or size, the alternative test criteria may specify the use of another WDT for communicating the message in the operating environment. In other words, this alternative test criteria may specify the use of a WDT for communicating the message based upon criteria other than message volume.

At decision block 435, an inquiry is conducted to determine whether the WDT previously selected in step 425 is the WDT chosen as a result of the application of the alternative test criteria in step 430. If the response to this inquiry is negative, the "NO" branch is followed from decision block 435 to step 440. The subscriber terminal unit communicates the message in step 440 with the WDT selected from the application of the alternative test criteria in step 430. For a positive response to the inquiry at decision block 435, the "YES" branch is followed to step 445. The subscriber terminal unit in step 445 communicates the message with the preferred WDT selected in step 445 based upon message volume. Upon completion of either step 440 or step 445, the process proceeds to the decision block at step 450.

For the exemplary process shown in FIG. 4, a preferred WDT (and corresponding transceiver) can be selected based upon the message volume. For example, the preferred WDT for communicating a low volume message is an overhead control channel transport mechanism, while the preferred WDT for communicating a medium volume message is an SMS transport technology. The preferred WDT for communicating a high volume message is CDPD, while the preferred WDT for communicating messages that exceed the large volume range is a voice-channel modem technology. Rather than initiate the communication of a message based upon the selection of this preferred WDT, however, the exemplary process 400 tests the preferred WDT against a set of alternative criteria to select the WDT most appropriate for the particular communication task. Alternative criteria can include time of day, location of the message recipient, communication costs or pricing, urgency or priority for delivery of message communication, and the communication latency. The application of the alternative test criteria in step 430 of FIG. 4 can be completed by a least-cost transport selection algorithm, where each of the selection criteria is treated as a cost element. The preferred WDT is not used to communicate the data message in the exemplary process 400 if the preferred WDT fails to satisfy the least-cost element for communicating the data message when compared to the alternative selection criteria.

In step 450, an inquiry is conducted at the subscriber terminal unit to determine whether another message is available for processing. If the response to this inquiry is negative, a loop is followed back to step 450 and the task begins anew. Otherwise, the "YES" branch is followed from step 450 to decision block 455. The subscriber terminal unit in step 455 determines whether it is operating in an operating environment different from the environment examined at step 410. If so, the "YES" branch is followed from decisions block 455 to step 410 to initiate a new monitoring operation. Otherwise, the "NO" branch is followed to step 425 for the selection of a WDT for communicating the new message.

In view of the foregoing, it will appreciated that the present invention provides a subscriber terminal unit operable with multiple wireless data transport technologies to communicate messages containing data content. The present invention can communicate messages of variable data content in an efficient and cost effective manner based upon the selection of an appropriate WDT to a complete communication task. For example, in the radio-to-base system direction, the subscriber terminal unit can select a WDT for communicating a data message based upon the volume of the data content in that message. This appropriate WDT can be automatically selected to communicated data message to achieve an effective communication of the data content. Multiple WDT transceivers can be aggregated in a single subscriber terminal unit and implemented by a single monolithic component to support efficient manufacture and convenient use of the device.

What is claimed is:

1. A system for communicating a message comprising data content in a cellular mobile radiotelephone (CMR) system, comprising:

a plurality of wireless data transport (WDT) transceivers, each capable of supporting wireless data communications in the CMR system, providing a plurality of WDTs, each WDT transceiver coupled to an antenna and operable to communicate the message with one of the WDTs via the antenna;

a controller operative to identify each of the WDTs operational within the CMR system for transporting the message and to select one of the WDT transceivers corresponding to one of the identified WDTs for communicating the message using a selection algorithm based on a heuristic process to support a learning capability based upon prior communication operations;

a user interface, coupled to the controller, operative to provide a unified interface to the WDT transceivers; and a normalization function, coupled to each WDT transceiver and to the controller, operative to transform the message into a format acceptable for transmission by the selected WDT transceiver and to transform the data content received by the selected WDT transceiver for presentation via the user interface, said normalization function comprising a plurality of transformation processes to support the operation of the plurality of WDT transceivers.

2. The system of claim 1, wherein the selection algorithm applies selection criteria, comprising at least one of data content volume and priority status of the data content, to the message.

3. The system of claim 1, wherein the controller is further operable to select the one of the WDT transceivers based upon a selection criterion applied to the data content of the message.

4. The system of claim 1, wherein the selection algorithm selects one of the WDT transceivers based on a characteristic of the data content.

5. The system of claim 4, wherein the characteristic of the data content comprises volume of the data content.

6. The system of claim 1, wherein the selection algorithm selects one of the WDT transceivers based upon a cost of communicating the message in the CMR system.

7. The system of claim 1, wherein the selection algorithm selects one of the WDT transceivers based upon a cost of communicating the data content in the CMR system.

8. The system of claim 1, wherein the selection algorithm selects one of the WDT transceivers based upon a priority assigned to communicating the data content.

9. The system of claim 1, wherein the CMR system supports a plurality of wireless data transports comprising overhead control channel, Short Message Service (SMS), Cellular Digital Packet Data (CDPD), and voice-channel modem transports.

10. A computer implemented process for communicating a message comprising data content in a cellular mobile radiotelephone (CMR) system, comprising the steps of:

providing a plurality of wireless data transport (WDT) transceivers, each capable of supporting wireless data communications in the CMR system and having a plurality of WDTs, wherein each WDT transceiver is coupled to an antenna and is operable to communicate the message with one of the WDTs via the antenna;

identifying each of the WDTs operational within the CMR system for transporting the message;

selecting one of the WDT transceivers corresponding to one of the identified WDTs for communicating the message using a selection algorithm based on a heuristic process to support a learning capability based upon prior communication operations; and transforming the message into a format acceptable for communication via the selected WDT transceiver and transforming the data content received by the selected WDT transceiver for presentation via a user interface.

11. The computer-implemented process of claim 10, wherein using the selection algorithm comprises applying selection criteria, comprising at least one of data content volume and priority status of the data content, to the message.

12. The computer-implemented process of claim 10, wherein the step of selecting one of the WDT transceivers comprises applying a selection criterion to the data content of the message.

13. The computer-implemented process of claim 10, wherein the selection algorithm selects one of the WDT transceivers based on a characteristic of the data content.

14. The computer-implemented process of claim 13, wherein the characteristic of the data content comprises volume of the data content.

15. The computer-implemented process of claim 10, wherein the selecting step comprises selecting one of the WDT transceivers based upon a cost of communicating the message in the CMR system.

16. The computer-implemented process of claim 10, wherein the selection algorithm selects of the WDT transceivers based upon a priority assigned to communicating the data content.

17. The computer-implemented process of claim 10, further comprising the step of supporting a plurality of wireless data transports, comprising overhead control channel, Short Message Service (SMS), Cellular Digital Packet Data (CDPD), and voice-channel modem transports, via the CMR system.

* * * * *

UNITED STATES PATENT AND TRADEMARK OFFICE
CERTIFICATE OF CORRECTION

PATENT NO. : 6,882,843 B1
DATED : April 19, 2005
INVENTOR(S) : Edward I. Comer

It is certified that error appears in the above-identified patent and that said Letters Patent is hereby corrected as shown below:

Column 14,
Line 44, "selection algorithm selects of the WDT" should read -- selection algorithm selects one of the WDT --.

Signed and Sealed this

Thirtieth Day of August, 2005

JON W. DUDAS
*Director of the United States Patent and Trademark Office*